Oct. 9, 1951 H. L. HORWITZ 2,570,238

METERING ARRANGEMENT FOR TELEPHONE SYSTEMS

Filed June 23, 1945

INVENTOR.
HENRY L. HORWITZ

BY Robert Harding Jr.

ATTORNEY

Patented Oct. 9, 1951

2,570,238

UNITED STATES PATENT OFFICE 2,570,238

METERING ARRANGEMENT FOR TELEPHONE SYSTEMS

Henry L. Horwitz, Jamaica, N. Y., assignor to Federal Telephone and Radio Corporation, New York, N. Y., a corporation of Delaware Application June 23, 1945, Serial No. 601,097

3 Claims. (Cl. 179—9)

This invention relates to telephone systems and more especially to call metering arrangements therefor.

A principal object is to provide improved circuit arrangements for controlling the operation of a calling subscriber's service meter.

Another principal object relates to call metering arrangements of the so-called "booster battery" type, wherein an improved arrangement is provided for deriving the booster voltage required for operation of the service meter.

Another object is to improve the accuracy and reliability of operation of a calling subscriber's service meter.

A feature of the invention relates to a call metering arrangement employing a call service meter which registers only when a booster voltage is applied thereto, in conjunction with a discharge tube which acts as a discriminator between low voltage battery e. g., talking battery, and the booster voltage impulses required for metering.

A further feature relates to a call metering arrangement of the "booster voltage" type, wherein the booster voltage is derived from the usual low frequency alternating current ringing equipment.

A still further feature relates to the novel organization, arrangement and relative interconnection of parts which cooperate to produce an improved service metering arrangement for telephone systems.

Other features and advantages not specifically enumerated will be apparent after a consideration of the following detailed descriptions and the appended claims.

Figures 1, 2:
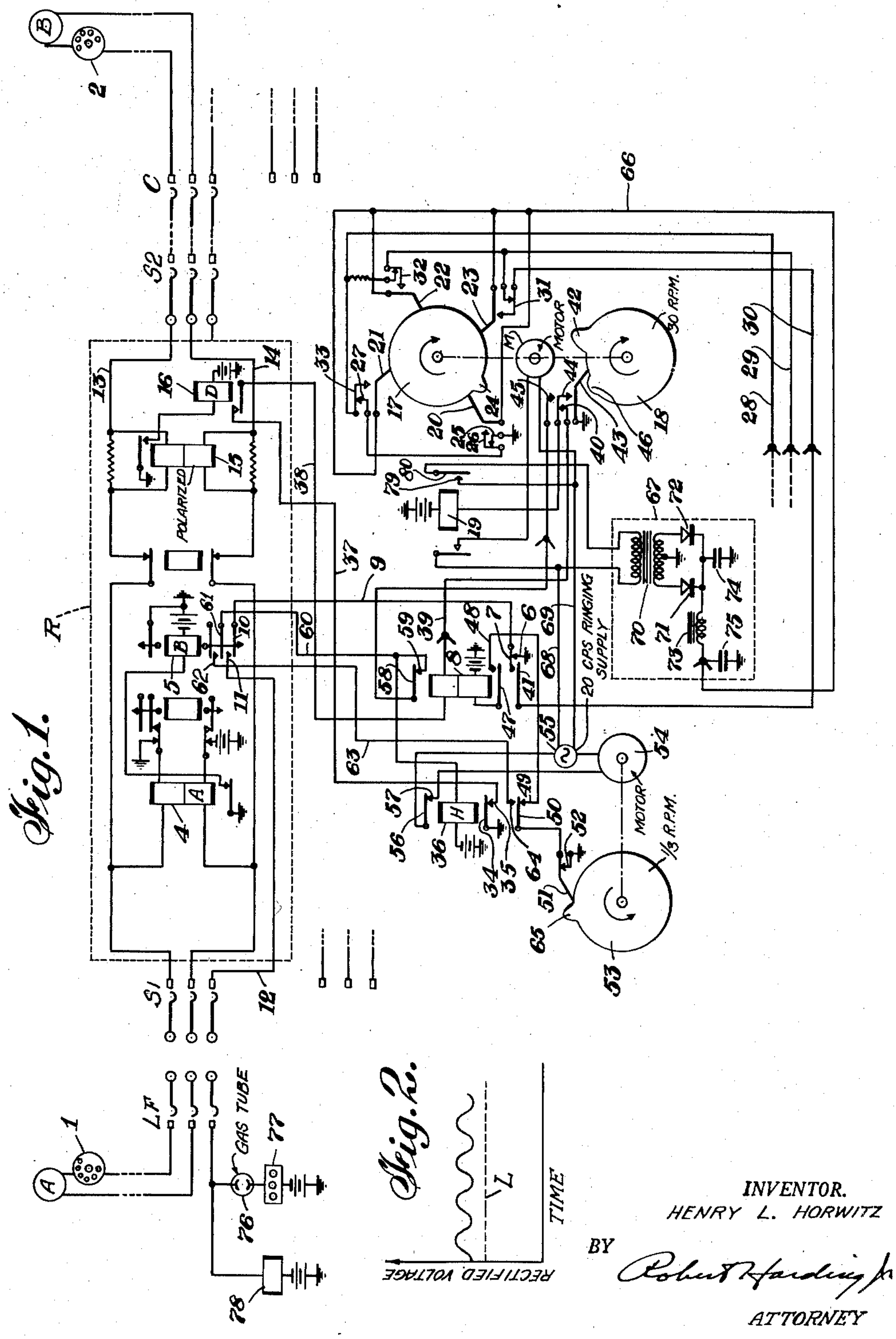
Fig. 1 is a generalized schematic diagram of a telephone system embodying features of the invention.
Fig. 2 is a wave diagram explanatory of certain features of the invention.

The invention in one of its aspects, is in the nature of an improvement on the system described in copending application Serial No. 601,096, filed June 23, 1945, now Patent No. 2,566,330, granted September 4, 1951, although it will be understood that in its broader aspects the invention is applicable to any telephone call metering arrangement. It will be clear therefore, that the illustration of the invention in connection with one particular kind of automatic telephone system, is not by way of limitation thereto.

There is disclosed in said application Serial No. 601,096, a service metering arrangement whereby a calling subscriber's service meter is operated in multiple units according to the assigned tariff rate of the called station with respect to the calling station. The metering impulses in the prior arrangement required the use of a special booster battery, and a specially designed service meter which was marginal in operation. In accordance with the present invention, both these requirements are avoided since use is made of the standard 20 C. P. S. ringing current equipment to derive the required booster voltage for operating the service meter, and a gas discharge device such as a neon bulb is connected in series with the service meter to act as the voltage discriminator.

Referring to Fig. 1 of the drawing, it will be assumed that the calling subscriber's station A has been extended in the well-known manner via line finder switch LF, selector switch S1, interoffice repeater trunk R, selector switch S2, and connector switch C, to the called substation B. It will also be assumed that the called station is idle and that the called subscriber answers. For a detailed description of one typical manner of extending the calling line to the called line by means of automatic switches, reference may be had to pages 53–65 inclusive of "Automatic Telephony," second edition, by Smith and Campbell, published in 1921.

As described in detail in said application Serial No. 601,096, when the repeater trunk R is seized by switch S1, the usual impulse relay 4 and impulse guard relay 5 operate, the latter being of the slow-to-release type. The extended connection via repeater R is rendered busy from the ground at contacts 6 and 7 of relay 8, conductor 9, contacts 10 and 11 of relay 5 to the sleeve or private wire 12 of the trunk. Since the called subscriber has answered, the answer-back relays 15 and 16 are operated and a circuit is closed from ground at contacts 34 and 35 of relay 36, conductor 37, contacts of relay 16, conductor 38, through the operating winding of relay 8, contacts 40 and 44 associated with cam wheel 18, and thence through the winding of the common start relay 19. Relay 19 is common to all the repeater trunks and at its contacts closes the circuit of motor M. Motor M thereupon starts the metering impulse wheel 17 and the cam wheel 18 in operation. At the same time, a locking circuit for relay 8 is closed via contacts 47, 48, 49, 50, 51 and 52.

As described in detail in said application Serial No. 601,096, the metering impulse wheel 17 has a projection 24 which operates in succession the contact springs 20, 21, 22 and 23. Each of these contact springs has an associated make-before-break contact pair and each spring 20, 21, 22 and 23 is connected via the common conductor 66 to a source of booster D. C. voltage 67. In accordance with the invention, the source 67 is energized from the usual 90 volt, 20 C. P. S. alternating current ringing machine which is connected to conductors 68, 69. This ringing current is applied through transformer 70 to a full wave rectifier arrangement comprising rectifiers 71 and 72. The rectified output is then passed through a smoothing filter comprising the inductance 73 and the by-pass condensers 74, 75. The filter 73, 74, 75, should be designed so that even if its output contains a pulsating component, the lower value of the pulsation should be above a predetermined level L as indicated in Fig. 2.

The movable contact 26 of the first contact set associated with wheel 17 has its associated contact 25 directly grounded. The contact 26 is connected to the break contact 27 of the second contact set whose associated contact 33 is connected to a conductor 28. Likewise, the contact 33 is connected to the break contact of the third set, the associated contact 32 of which is connected to the break contact of the fourth set. The contact 31 of this fourth set is connected to a conductor 30. The conductors 28, 29, 30 are multipled to the contacts, similar to contact 41, of relays individually associated with respective repeater trunks similar to R. Likewise, conductor 29 is multipled to the contacts 41 of relays similar to relay 8 associated with other repeater trunks, and likewise for conductor 28. In the particular example illustrated, the repeater R has the contact 41 of its individual relay 8 multipled to the fourth contact set which is associated with spring contact 23. Consequently, when the wheel 17 has made its complete revolution, there has been applied to conductor 30 a succession of four metering impulses of booster voltage via conductor 66 as each of the contact sets is successively closed by means of projection 24. These booster metering impulses pass via conductor 30, contacts 41 and 7 of relay 8, contacts 10 and 11 of relay 5, thence over the sleeve or private wire 12 to the private wire of the calling line.

Connected to the calling subscriber's private wire is a gaseous discharge tube 76 such as a neon bulb of conventional design having a pair of electrodes in a gaseous atmosphere, and in series therewith is connected the winding of any suitable service meter 77 which is connected to grounded 48 volt talking battery similarly to the battery for the cutoff relay 78. As is well-known in the discharge tube art, the neon bulb 76 has a striking voltage and a so-called drop-out voltage. In other words, it acts as a voltage discriminator. The booster metering impulses applied to conductor 66 as above described are such that they are above the striking voltage of the neon bulb 76. In order to prevent false operation however, it is important that the filter 73, 74, 75, be designed so that the rectified potential never drops below the extinguishing or drop-out voltage L of the neon bulb 76. As a result of this series connection of the bulb 76 with the service meter 77, and the correlation of the booster voltage with the striking and drop-out voltages of the said bulb 76, it is not necessary that the meter 77 be of the marginal type. Since the bulb 76 has an ignition or striking voltage and also a drop-out voltage both of which are well above the usual exchange battery voltage e. g., 48 volts, the meter 77 is effectively disconnected from the release trunk or private wire except when no booster voltage for metering is applied as above described. It is possible therefore, to design the meter 77 with a less expensive low resistance winding and with a lower critical adjustment of the meter operation. Furthermore, the resistance of this meter winding being in series with the neon bulb 76, acts as a current limiting device for the bulb and no separate current limiting resistance in series with the bulb is required. When multiple metering is desired during the continuance of the conversational connection, the metering cycle of wheel 17 may be automatically repeated under control of another cam wheel 53, whose cam projection 65 controls contacts 51 and 52 which in turn control the locking winding of the start relay 8. As described in detail in said application Serial No. 601,096, when the wheel 17 has completed its single cycle, the shoulder 46 on wheel 18 connects ground via contacts 43, 44 and 45, contacts 58, 69, to operate the release relay 36. Relay 36 thereupon breaks the locking circuit for relay 8. The recurrent operation of the wheel 17 is therefore controlled by the cam wheel 53 when multiple metering is desired.

Likewise, as described in detail in said application Serial No. 601,096, when the common motor start relay 19 is operated, the start circuit is locked out from other trunks by means of the opening of contacts 40 and 44. However, when the desired metering cycle has been completed, contacts 40 and 44 are reclosed thus placing the common motor start relay 19 under control of any other trunk which is multipled to conductor 39 and which trunk is in the answer-back condition.

In order to reduce the load on the 20 C. P. S. ringing current machine, the circuit for rectifiers 71 and 72 may be normally open at the contacts 79 and 80 of the start relay 19. Thus the ringing current machine is not required to supply power for the booster metering voltage until the member 17 is started in operation under control of motor M, which in turn is controlled by relays 8 and 19.

Various changes and modifications may be made in the disclosed embodiment without departing from the spirit and scope of the invention.

What is claimed is:

1. In a telephone system including calling and called lines, means for connecting a desired called line with a calling line, a service meter operatively associated with said calling line for making a record of the call, said meter being operable to record one or more units in response to received metering impulses in accordance with the number of such pulses, and a source of alternating ringing current; means for applying impulses to said meter corresponding to the tariff zone of a particular called line, comprising a discharge tube having a predetermined break-down and extinguishing voltage connected in circuit with said meter, voltage conversion means connected to said source of ringing current and adapted to develop a voltage having a D.-C. component in excess of the break-down and extinguishing voltages of said tube, circuit means interconnecting said discharge means and said voltage conversion means, contact means in said circuit, and controller means adapted to operate said contact means, said controller means being effective upon an answer-back condition on the called line to operate said contact means to apply rectified voltage pulses of a number corresponding to the number assigned to the tariff zone of the particular called line across said tube and said meter.

2. A metering arrangement according to claim 1, said voltage conversion means having primary and secondary windings comprising a transformer having primary and secondary windings, a relay responsive to said answer-back responsive circuit, contact means operatively associated with said relay and interconnecting said source of ringing current and the transformer primary winding, grounded center tap for the transformer secondary winding and rectifier means connected to each side of said transformer secondary winding.

3. A metering arrangement according to claim 1, an interrupter, contacts in said circuit operatively associated with said interrupter and motor means for operating said interrupter, said circuit including relay means operative upon an answer-back condition being established on the called line, transformer means for said voltage connection and contact means for said relay adapted to connect said source of ringing current with said motor and with said transformer upon operation of said relay.

HENRY L. HORWITZ.

REFERENCES CITED

The following references are of record in the file of this patent:

UNITED STATES PATENTS

| Number | Name | Date |
|---|---|---|
| 1,723,153 | Green | Aug. 6, 1929 |
| 2,041,964 | Sandalls | May 26, 1936 |
| 2,060,261 | Stokely | Nov. 10, 1936 |
| 2,073,756 | Osten-Sacken | Mar. 16, 1937 |
| 2,271,072 | Halligan et al. | Jan. 27, 1942 |